US006706814B2

United States Patent
Demirors

(10) Patent No.: US 6,706,814 B2
(45) Date of Patent: Mar. 16, 2004

(54) MONOVINYLIDENE AROMATIC POLYMERS BASED ON HIGHLY LINEAR HIGH MOLECULAR WEIGHT POLYBUTADIENE RUBBERS AND A PROCESS FOR THEIR PREPARATION

(75) Inventor: Mehmet Demirors, Midland, MI (US)

(73) Assignee: Dow Global Technologies Inc., Midland, MI (US)

( * ) Notice: Subject to any disclaimer, the term of this patent is extended or adjusted under 35 U.S.C. 154(b) by 0 days.

(21) Appl. No.: 10/188,456

(22) Filed: Jul. 3, 2002

(65) Prior Publication Data

US 2003/0055177 A1 Mar. 20, 2003

Related U.S. Application Data

(60) Provisional application No. 60/309,725, filed on Aug. 2, 2001.

(51) Int. Cl.⁷ .................. C08L 23/00; C08L 23/04; C08L 51/00
(52) U.S. Cl. .......... 525/191; 525/207; 525/210; 525/221; 525/222; 525/232; 525/238; 525/240; 525/241
(58) Field of Search ............ 525/191, 207, 525/210, 221, 222, 232, 238, 240, 241

(56) References Cited

U.S. PATENT DOCUMENTS

| | | |
|---|---|---|
| 3,309,422 A | 3/1967 | Doak et al. |
| 3,487,127 A | 12/1969 | Erchak, Jr. et al. |
| 4,146,589 A | 3/1979 | Dupre |
| 4,153,645 A | 5/1979 | Lanza |
| 4,183,878 A | 1/1980 | Biletch |
| 4,214,056 A | 7/1980 | Lavengood |
| 4,334,039 A | 6/1982 | Dupre |
| 4,493,922 A | 1/1985 | Echte et al. |
| 6,441,090 B1 * | 8/2002 | Demirors et al. ............ 525/71 |
| 6,545,090 B1 * | 4/2003 | Demirors et al. ............ 525/70 |

FOREIGN PATENT DOCUMENTS

| | | |
|---|---|---|
| EP | 015 752 | 8/1983 |
| EP | 048 389 | 1/1985 |
| EP | 158 258 | 10/1985 |
| EP | 096 447 | 9/1986 |
| EP | 152 752 | 8/1988 |
| EP | 418 042 | 2/1994 |
| GB | 1 027 326 | 4/1966 |
| GB | 1 199 672 | 7/1970 |
| JP | 95005789 | 1/1995 |
| JP | 02762722 | 10/1998 |

* cited by examiner

Primary Examiner—Nathan M. Nutter

(57) ABSTRACT

Disclosed are rubber-modified monovinylidene aromatic polymers with improved toughness and rigidity as well as a process for the preparation thereof. The polymer comprises
  a) a monovinylidene aromatic polymer matrix; and
  b) rubber particles dispersed therein, characterized in that the rubber particles are produced from a diene rubber having substantially linear structure containing less than one long chain branch per 10,000 carbon atoms in the polymer backbone with a solution viscosity of 5 cPoise to 1000 cPoise and a Mooney Viscosity of 5 to 120.

18 Claims, No Drawings

US 6,706,814 B2

MONOVINYLIDENE AROMATIC POLYMERS BASED ON HIGHLY LINEAR HIGH MOLECULAR WEIGHT POLYBUTADIENE RUBBERS AND A PROCESS FOR THEIR PREPARATION

CROSS REFERENCE STATEMENT

This application claims the benefit of U.S. Provisional Application No. 60/309,725, filed Aug. 2, 2001.

BACKGROUND OF THE INVENTION

The present invention relates to rubber-reinforced monovinylidene aromatic polymer compositions of the type commonly referred to as "high impact polystyrene" or "HIPS" and copolymers of Acrylonitrile-Styrene-Butadiene, "ABS". More particularly, the invention relates to such compositions, in which the rubber-reinforcing particles are produced from a specific polybutadiene rubber, have a specific particle size distribution and a process for the production of such compositions.

Rubber-reinforced polymer compositions of the HIPS type are widely used in many applications because of their ease of molding, good gloss, and generally good mechanical properties. It has been known that the specific properties of the rubbers used has a strong influence on the properties of HIPS resins. The specific attributes of the rubbers such as micro structure, molecular weight, molecular weight distribution and branching are important parameters. Many examples exist in the art that combine one or more of these attributes to improve the properties of the final product.

It has been known for some time that improved combinations of gloss, flow and mechanical properties can be achieved in such rubber-reinforced polymers by providing a so-called "bimodal" distribution in the sizes of the rubber reinforcing particles, i.e. the particles show two distinct peaks in their size distribution. This can be achieved by combining two or more such resins or components, each having a group of rubber particles having a different average particle size. Various monovinylidene aromatic polymer compositions are known having at least two groups of rubber particles wherein the groups have different average particle sizes. For example such compositions are disclosed in U.S. Pat. Nos. 4,146,589; 4,214,056 and 4,334,039, incorporated herein by reference and European Patents 0 096 447, 0 158 258 and 0 152 752.

U.S. Pat. No. 4,493,922 also discloses rubber-reinforced polystyrene compositions having certain bimodal rubber particle size distributions. The average rubber particle sizes disclosed for the groups of particles range from 2 to 8 micrometers (especially from 5 to 6 micrometers) for the group of larger particles and from 0.2 to 2.0 micrometers for the group of smaller particles. A number of methods are proposed for achieving such a bimodal particle distribution. For example, U.S. Pat. 4,153,645 discloses a method for the preparation of a HIPS-type polymer in which two polymer compositions are prepared using standard production processes, the compositions having different average particle sizes. These two polymer compositions are then mixed by a subsequent mechanical blending process.

An alternative approach to producing HIPS polymers with a bimodal rubber distribution has been to introduce feed streams of monomer and rubber at two different points in the polymerization system. This results in a polymer product which generally has a relatively broad distribution of rubber particle sizes. Examples of this approach are described in EP 0 015 752, U.S. Pat. No. 4,334,039 and EP 0 096 447. A disadvantage of such methods is that the desired mechanical properties of the resulting product can be somewhat poor and difficult to control.

Yet a another approach to a bimodal rubber particle size distribution is disclosed in U.S. Pat. No. 4,146,589 and EP 0 048 389. In this method, two prepolymer compositions are prepared containing rubber particles with different particle sizes. The prepolymer compositions are then mixed and further polymerized to provide a polymer having a bimodal rubber particle size distribution.

Other relevant references include EP-418,042 wherein the rubber comprises a partially coupled radial or star rubber, having a cis content of less than or equal to about 70 percent, JP 02762722 wherein the rubber is a mixture of a high cis polybutadiene of high molecular weight and a low cis polybutadiene of low molecular weight, and JP 95005789 wherein the rubber is a mixture of a high molecular weight polybutadiene and a low molecular weight polybutadiene, both having a cis content of greater than 80 percent. However, a desirable balance of impact strength and tensile strength is still not attained for some specific end-use applications.

A lot of work has gone into designing specific rubber particle size distribution in the finished resin through modification of rubber that is being used, modification of process variables during the manufacture of the resin, blending of different resin compositions and the like. However, very little effort is gone into understanding how the rubber molecules in rubber particles function and how their performance can be improved further.

Therefore, it is still highly desirable to obtain a rubber modified monovinylidene aromatic polymer having an improved balance of gloss, flow, impact and tensile properties for select applications.

SUMMARY OF THE INVENTION

The present invention is a rubber modified monovinylidene aromatic polymer comprising:
  a) a monovinylidene aromatic polymer matrix; and
  b) rubber particles dispersed therein, characterized in that the rubber particles are produced from a diene rubber having substantially linear structure containing less than one long chain branch per 10,000 carbon atoms in the polymer backbone with a solution viscosity of 5 cPoise to 1,000 cPoise and a Mooney Viscosity of from 5 to 120.

A preferred embodiment of the present invention is a rubber modified monovinylidene aromatic polymer comprising:
  a) a monovinylidene aromatic polymer matrix; and
  b) rubber particles dispersed therein, in the form of cellular or core-shell particles, which particles are produced from a polybutadiene rubber of substantially linear structure containing less than one long chain branch per 10,000 carbon atoms in the polymer backbone.

Another aspect of the present invention is a process for preparing a rubber-modified monovinylidene aromatic polymer comprising the steps of: (a) continuously supplying a reaction mixture comprising monovinylidene aromatic monomer and a dissolved diene rubber to a reactor means, (b) continuously polymerizing the monovinylidene aromatic monomer in the presence of the dissolved diene rubber in the reactor means under conditions whereby phase inversion subsequently occurs, (c) continuously removing from the reactor means a diene rubber-reinforced monovinylidene aromatic polymer, which process is characterized in that: (d) the diene rubber which is dissolved in the reaction mixture comprises substantially linear polybutadiene containing less than one long chain branch per 10,000 carbon atoms in the polymer backbone.

In the preferred embodiment, the process further comprises (e) the use of appropriate amounts of grafting initiators and sufficient level of agitation of the reactors to achieve desired rubber particle size distribution.

In another preferred embodiment, the process further comprises (f) the use of a rubber blend comprising two different diene rubbers to achieve desired rubber particle size and particle size distribution.

DETAILED DESCRIPTION OF THE PREFERRED EMBODIMENTS

Monovinylidene aromatic polymers suitable for the present invention are those produced by polymerizing a vinyl aromatic monomer. Vinyl aromatic monomers include, but are not limited to those described in U.S. Pat. Nos. 4,666,987, 4,572,819 and 4,585,825, which are herein incorporated by reference. Preferably, the monomer is of the formula:

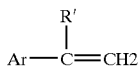

wherein R' is hydrogen or methyl, Ar is an aromatic ring structure having from 1 to 3 aromatic rings with or without alkyl, halo, or haloalkyl substitution, wherein any alkyl group contains 1 to 6 carbon atoms and haloalkyl refers to a halo substituted alkyl group. Preferably, Ar is phenyl or alkylphenyl, wherein alkylphenyl refers to an alkyl substituted phenyl group, with phenyl being most preferred. Typical vinyl aromatic monomers which can be used include: styrene, alpha-methylstyrene, all isomers of vinyl toluene, especially paravinyltoluene, all isomers of ethyl styrene, propyl styrene, vinyl biphenyl, vinyl naphthalene, vinyl anthracene and the like, and mixtures thereof. The vinyl aromatic monomers may also be combined with other copolymerizable monomers. Examples of such monomers include, but are not limited to acrylic monomers such as acrylonitrile, methacrylonitrile, methacrylic acid, methyl methacrylate, acrylic acid, and methyl acrylate; maleimide, phenylmaleimide, and maleic anhydride. It is preferred, however, for the practice of the present invention to use either less than about 10 percent by weight or substantially no other copolymerizable monomer. The specified particle size distribution is no longer optimal for larger amounts of one or more of these monomers. In general, the preferred monovinylidene aromatic monomers are styrene, alpha methyl styrene, one or more of the vinyl toluene isomers, and/or mixtures of two or more of these, with styrene being the most preferred monovinylidene aromatic compound.

The monovinylidene aromatic polymer typically has a weight average molecular weight (Mw) of from approximately 120,000 to 1,000,000.

The rubbers preferably employed in the practice of the present invention are those polymers and copolymers which exhibit a second order transition temperature which is not higher than about 0° C., preferably not higher than about −50° C. and more preferably not higher than about −70° C. as determined or approximated using conventional techniques, e.g., ASTM Test Method D-746-52 T.

Highly preferred rubbers are alkadiene polymers. Suitable alkadienes are 1,3-conjugated dienes such as butadiene, isoprene, chloroprene or piperylene. Most preferred are homopolymers (excepting any coupling monomers) prepared from 1,3-conjugated dienes, with such homopolymers of 1,3-butadiene being especially preferred. Alkadiene copolymer rubbers containing small amounts, for example less than 15, preferably less than 10 weight percent, of other monomers such as monovinylidene aromatics can also be employed if the rubbers meet the other qualifications described herein. The most preferred rubbers are the linear homopolymers of 1,3-butadiene which have a cis content of at least 30 percent.

The rubbers suitable for the present invention can be made by anionic polymerization or Ziegler-Natta polymerization well known to those skilled in the art.

Regarding the rubber materials suitable for use according to the present invention, the essential requirement of present materials in that, the polybutadiene rubber is of substantially linear type and does not contain long chain branching. Such rubbers usually contain less that one long chain branch per 10000 carbon atoms on the polymer backbone. These rubbers must have molecular weight in the range most suitable for making HIPS and ABS resins. The micro-structure of these rubbers can be any of the conventional types containing various amounts of 1,2-vinyl, 1,4-cis and 1,4-trans levels. The rubbers of thin type can be prepared by anionic polymerization of butadiene as well as Ziegler-Natta type of polymerization techniques. One of the most economical routes to manufacturing these rubbers utilize neodymium based catalysts as described in EP 109971, Japanese patent applications No. 1999-307572 and 1999-322370 and U.S. Pat. No. 5,914,377, relevant teachings of which are incorporated herein by reference. The level of branching in rubbers can be determined readily by the techniques generally well known to those skilled in the art as detailed in T. H. Mourey and S. T. Balke, "A Strategy for Interpreting Multidetector Size-Exclusion Chromatography Data I: Development of a Systematic Approach," Am. Chem. Soc. Symp. Ser.,521, 180 (1993); A. Rudin, "Measurement of Long-Chain Branch Frequency in Synthetic Polymers," in H. G. Barth and J. W. Mays (Eds.), Modern Methods of Polymer Characterization," John Wiley and Sons, New York, 1991; and S. Pang and A. Rudin, "Size-Exclusion Chromatographic Assessment of Long-Chain Branch Frequency in Polyethylenes," Am. Chem. Soc. Symp. Ser. 521, 254 (1993).

As used herein, the molecular weights referred to are the weight average molecular weights or Mw's for the rubber components as determined by the gel permeation chromatographic techniques described by ASTM Test Method designated D-3536 (polystyrene standard) and expressed without correction for the differences between rubber and polystyrene standards.

The rubbers particularly suitable for this invention are substantially linear in that they contain less than one long chain branching per 10,000 carbon atoms on the polymer backbone, preferably they contain less than one long chain branching per 10,500 carbon atoms on the polymer backbone and more preferably they contain less than one long chain branches per 11,000 carbon atoms in the polymer backbone. The rubbers particularly suitable for this invention have a solution viscosity (5% by weight in styrene at 23° C. using Canon-Fenske, capillary viscometer, capillary No: 400, 1.92 mm inside diameter) of 5 to 1000 cPoise, preferably from 10 to 900 cPoise and more preferably from 20 to 800 cPoise. The rubbers particularly suitable for this invention also have a Mooney viscosity (ML4+1, 100° C. DIN 53523) of 5 to 120, preferably from 10 to 100 and more preferably from 20 to 90.

Although the rubber may contain a small amount of a crosslinking agent, excessive crosslinking can result in loss of the rubbery characteristics and/or render the rubber insoluble in the monomer.

The rubber is advantageously employed in amounts such that the rubber-reinforced polymer product contains from about 2 to about 20 percent, preferably from about 3 to about 17 percent, more preferably about 3 to about 15 weight percent rubber or rubber equivalent, based on the total weight of the rubber modified monovinylidene aromatic polymer.

The term "rubber" or "rubber equivalent" as used herein to indicate weight amounts of rubber material is intended to mean, for a rubber homopolymer (such as polybutadiene), simply the amount of rubber, and for a block copolymer, the amount of the copolymer made up from monomer(s) which, when homopolymerized form a rubbery polymer. For example, for calculating the amount of rubber in a composition where a butadiene-styrene block copolymer rubber has been employed, the "rubber" or "rubber equivalent" of the composition is calculated based on only the butadiene component in the block copolymer. Obviously where physical properties or other aspects of the rubber material are measured, the complete rubber material including any comonomers is referred to.

It has been surprisingly found that the rubbers of present invention lead to better resin products. This is believed to be due to the fact that when a rubber particle is formed, the rubber is converted to a three dimensional network by cross-linking the rubber molecules. As the particles are deformed during the fracture process, they extend and become the load bearing component absorbing the fracture energy, leading to toughening of the resin. With conventional rubbers containing long chain branching, not all the rubber participates in the load bearing process. This is because each branch point introduces another free end and when cross-linked a certain amount of these free ends, end up not joining the three dimensional network, becomes wasted, not contributing to the toughening of the resin. While this wasted portion of the rubber does not contribute to the toughening of the resin, it does however continue to have detrimental impact on reducing the flow of the resin, reducing the gloss and rigidity, as well as the cost.

A substantially linear rubber molecule on the other hand has only two chain ends, and when cross-linked into a three dimensional polymer network contains less loose chain ends leading to better toughening without suffering detrimental attributes of rubber. On balance such rubbers lead to resins that have a better balance of properties.

Regarding the morphology of rubber particles, they can have core-shell type, cellular type, labyrinth type as well as onion skin type.

The process of the present invention is characterized by the utilization of a rubber having substantially linear molecular structure under process conditions, whereby a series of particle sizes and distributions can be obtained with standard polymerization processes and equipment.

In the preparation of the rubber-reinforced polymers, a reaction mixture is prepared by dissolving the rubber in the monomer(s) and the resulting monomer/rubber solution, referred to herein as the reaction mixture, is supplied to a reactor means and subsequently polymerized. The amount of rubber initially dissolved in the reaction mixture is dependent on the desired concentration of rubber in the final rubber-reinforced polymer product, the degree of conversion during polymerization and the viscosity of the reaction mixture solution. Specifically, the viscosity of the reaction mixture solution is advantageously less than about 10000 centipoise. At higher viscosities, the reaction mixture solution is difficult to process. Provided the viscosity of the reaction mixture is not undesirably high, the reaction mixture solution will generally comprise from about 4 to about 20, weight percent of the rubber, said weight percent being based on the total amounts of rubber and monomers employed.

Optionally, the reaction mixture can contain an organic liquid diluent. Organic liquid diluents suitably employed are normally liquid organic materials which do not boil at the polymerization conditions employed and which form a solution with the polymerizable monomer(3) and the polymer prepared therefrom. Representative organic liquid diluents include aromatic (and inertly substituted aromatic) hydrocarbons such as toluene, benzene, ethylbenzene and xylene; saturated or inertly substituted, saturated aliphatics having either straight or branched chains of five or more carbon atoms such as heptane, hexane and octane; alicyclic or inertly substituted alicyclic hydrocarbons having five or six carbon atoms such as cyclohexane. Preferred of such organic liquid diluents are the inertly substituted aromatics, with ethylbenzene and xylene being most preferred. In general, the organic liquid is employed in amounts sufficient to improve the processability and heat transfer during polymerization, e.g., flow characteristics of the polymerization mixture. Such amounts will vary depending on the rubber, monomer and diluent employed, the process equipment and the desired degree of polymerization. In general, if employed, the reaction mixture will normally contain from about 2 to about 30 weight percent of the diluent based on the total weight of the rubber, monomer and diluent.

During the polymerization of the resulting reaction mixture, the polymerization conditions are maintained such that phase inversion subsequently occurs. Under such conditions the monomer is polymerized both with the rubber (grafted) and separately (free polymer), which dissolved rubber thereby becomes grafted with a portion of polymerized monomer. The balance of free polymer, basically incompatible with the rubber, forms a discontinuous smaller volume polymer/monomer phase dispersed throughout the larger volume continuous phase of the monomer/rubber (including grafted rubber) solution.

Eventually, at a point after sufficient amounts of free polymer are formed, the free polymer converts from a discontinuous phase dispersed in the continuous phase of the unpolymerized monomer(s), through a point where there is no distinct continuous or discontinuous phases in the polymerization mixture, to a continuous polymer phase having the rubber dispersed as discrete particles there through. As the polymer/monomer phase becomes the larger volume phase and hence the continuous phase, the grafted rubber forms a discontinuous phase. This is the point in the polymerization when phase inversion occurs and the rubber becomes dispersed in the form of particles through the continuous polymer phase resulting in a product having rubber particles dispersed in a matrix of monovinylidene aromatic polymer.

Preferably, at phase inversion, the rubber is sufficiently grafted such that the disperse rubber particles, following initial sizing, are capable of retaining essentially the same average particle size and morphological properties throughout the remainder of the polymerization process.

In a preferred embodiment, the amount of grafted rubber is at least 30 percent of the total rubber at phase inversion. The degree of grafting of the diene rubber at the point of phase inversion has a significant impact on the properties of the resultant rubber modified polymer produced. Generally, the number of grafts per chain contributes to the particle size, the structure and the amount of occluded matrix polymer within the rubber particles. Higher grafting level results in higher gel content, a larger amount of grafted rubber and higher graft and occluded matrix polymer content within the rubber particles. The increased gel content is highly desirable in that it enables an increased rubber phase volume to be achieved.

Careful control of back mixing during the polymerization process is critical in achieving the desired rubber particle size. Accordingly, one essential feature of the present invention is that prior to phase inversion the polymerization must proceed in a plug-flow form with a limited or minimum amount of back mixing. The desired rubber particle size will not be realized if the polymerization reaction mixture is allowed to be back mixed extensively or, worse yet, totally. Therefore, it is preferable that the degree of back mixing be controlled or limited to such an extent that the desired rubber particle size can be obtained. The degree and type of control for the amount of back mixing will depend on, in part, the geometric features of the equipment being employed in the polymerization process, the achievement of which control is well within the capability of those who are skilled in the art using conventional process control techniques without undue experimentation.

The polymerization process features that are utilized to achieve the requisite rubber particle size distribution include the use of a graft promoting chemical initiator, such as the peroxide initiators including the peresters, e.g., tertiary butyl peroxybenzoate, tertiary butyl peroxyacetate, dibenzoyl peroxide, and dilauroyl peroxide, the perketals, e.g., 1,1-bis tertiary butyl peroxycyclohexane, 1,1-bis tertiary butyl peroxy-3,3,5-trimethyl cyclohexane, and di-cumyl peroxide, and the percarbonates; photo chemical initiation techniques; and the like. Preferred initiators include tertiary butyl peroxy benzoate, 1,1-bis tertiary butyl peroxy cyclohexane 1,1-bis tertiary butyl perox-3,3,5 trimethyl cyclohexane and tertiary butyl peroxy acetate.

Initiators may be employed in a range of concentrations dependent on a variety of factors including the specific initiator employed, the desired levels of polymer grafting and the conditions at which the mass polymerization is conducted. Specifically, in the preferred mass polymerization process for preparing rubber-reinforced polymers, from about 50 to about 2000, preferably from about 100 to about 1500, weight parts of the initiator are employed per million weight parts of monomer resulting in a product having rubber particles dispersed in a matrix of monovinylidene aromatic polymer.

Phase inversion has usually taken place at a point in the polymerization process where the reaction mixture contains a solids level which, in weight percent based on reaction mixture, is about 2.5 or about 3 times the weight content of the added rubber material. Therefore, a relatively high agitation level is preferably maintained until a point in the polymerization process where the reaction mixture contains a solids level which, in weight percent based on reaction mixture, is at least about 3, preferably about 4 times the weight content of the added rubber material.

For example, when there is about 5 to about 10 weight percent rubber added to the reaction mixture, relatively high agitation is maintained until the reaction mixture contains about 30 percent by weight solids. As used herein, the term solids refers to the polymeric components of the reaction mixture such as the rubber which was added initially and the monovinylidene aromatic polymer which has been formed.

Depending upon particular production equipment there may also be other process features that can be utilized to further facilitate the formation of the specified rubber particle size distribution.

In general, continuous methods are employed for mass polymerizing the monovinylidene aromatic compound in the reaction mixture. In the practice of the present invention it is generally preferred to utilize a stratified, linear flow, stirred tower type reactor, also referred to as a plug flow type reactor. Such reactors are well known. See, for example U.S. Pat. No. 2,727,884.

An important aspect of such polymerization processes is that a significant portion of the polymerization of the monovinylidene aromatic monomer in the reaction mixture can take place in the presence of the dissolved rubber. Phase inversion and precipitation and dispersion of the rubber particles does not occur until after sufficient grafting of monovinylidene aromatic polymer onto the rubber, which primarily takes place when the rubber is in solution.

This is a major advantage over polymerization in completely mixed, stirred tank type reactors (non-stratified, non-plug flow) which are operated at a predetermined level of conversion. Typically, due to the presence of significant levels of the already polymerized monovinylidene aromatic polymer, the rubber which may be dissolved in the feed stream to such a reactor, is immediately dispersed as particles before graft polymerization can occur and, more importantly, before the high and low solution viscosity components of an appropriate rubber material can separate and form separate groups of rubber particles.

Moreover, the process according to the present invention can be practiced advantageously on standard mass polymerization process equipment not otherwise capable of the preparation of monovinylidene aromatic polymers with bimodal rubber particle distributions without significant equipment modifications. Such standard equipment typically utilizes a single supply of the unpolymerized reaction mixture comprising a solution of rubber, monomer, optional diluent and other additives. The reaction mixture is then polymerized as it proceeds through one or a series of such reactor vessels. At the end of the reactor vessel (series) the product is removed and diluent and any residual monomer removed.

The polymerization mixture may also contain other additive materials and/or polymerization aids such as plasticizers or lubricants such as mineral oil, butyl stearate or diethyl phthalate; stabilizers including antioxidants (e.g., alkylated phenols such as di-tert-butyl-p-cresol or phosphates such as trisnonyl phenyl phosphate); chain transfer agent, such as an alkyl mercaptan such as n-dodecyl mercaptan; or mold release agents, e.g., zinc stearate; all of which additives and/or polymerization aids are added to the reaction mixture where appropriate including before, during or after polymerization.

The use of a chain transfer agent is optional and is usually employed only in the production of a composition or prepolymer containing larger size rubber particles (e.g. having an average particle size of at least one micrometer). If employed, the chain transfer agent is generally employed in an amount of from about 0.001 to about 0.5 weight percent based on the total weight of the polymerization mixture to which it is added.

The temperatures at which polymerization is most advantageously conducted are dependent on the specific components, particularly initiator, employed but will generally vary from about 60 to about 190° C.

Crosslinking of the rubber in the resulting product and removal of the unreacted monomers, as well as any reaction diluent, if employed, and other volatile materials is advantageously conducted employing conventional techniques.

The rubber modified monovinylidene aromatic polymer of the present invention has an excellent balance of flow, gloss impact and tensile modulus properties, allowing for its use in various applications including injection molding applications, extrusion applications, foam applications including large appliances, consumer electronics, air conditioners, refrigerators, freezers, small appliances, cassettes, radio, TV, stereo cabinets, furniture and furnishings, toys, housewares, building and construction applications, footwear, medical applications, packaging, disposables such as tumblers, glasses, dishes, cups, bowls, flatware, cutlery, blowmolded items, foam board, sheet, films and the like.

The following examples are set forth to illustrate the present invention and should not be construed to limit its scope. In the examples, all parts and percentages are by weight unless otherwise indicated.

EXAMPLES

All physical properties are measured on injection molded samples.

Measurement of Long Chain Branching in Polybutadiene by Size Exclusion Chromatography with Differential Viscometry Detection (SEC/DV)

Experimental Conditions

Size exclusion chromatography is performed on three, TSK-Gel, GMH6 columns from TosoHaas (E0001, E0003 and C0010) held at ambient temperature. The eluent is vacuum degassed, HPLC grade tetrahydrofuran flowing at 1 ml/minute. A Waters 2690 LC system is used to deliver solvent and inject the samples. The injection volume is 50 microliters. The differential viscosity detector is a Viscotek Model H-operated at 35° C. The concentration detector is a Waters, 2410 differential refractive index (DRI) detector operated at 35° C. The detectors are plumbed in series with the DRI last in line. Data is acquired and reduced using Calibre software from Polymer Laboratories. Universal calibration is established using linear, narrow molecular weight PS standards from Polymer Laboratories. The range of molecular weights used in the calibration span from 6,850,000 g/mol down to 1,300 g/mol. The universal calibration curve is fit with a third order polynomial. Concentrations of individual standards depend on the molecular weight, and range from 0.2 mg/ml to 1 mg/ml (high Mw to low Mw). The systematic approach described by Balke (1) is used to ascertain the interdetector offset and to insure proper column and viscometer calibration. Dow PS 1683 is used as the broad reference material at a concentration of 1.4 mg/ml.

High cis polybutadiene samples are kept in the dark and stored in a freezer until prepared for analysis. Sample preparation consists of weighing 0.010 to 0.012 g (weighed to the nearest 0.0001 g) into a vial, adding 10 ml of HPLC grade THF containing~1000 ppm of IONOL and shaking gently on a flat bed shaker for 24 hours. The solutions are filtered through a 1 micron PTFE filter prior to injection.

Size exclusion chromatography coupled to molecular weight sensitive detectors (light scattering and/or differential viscometry) has been used to measure long chain branch frequency in polymers (2, 3). In this work, slight modifications to the procedures described in references 2 and 3 were employed. The steps are as follows:

1) Assume a constant branch frequency $\lambda$, described by the equation $\lambda=(n*13,500/Mb)$, where n is the number of trifunctional branch sites per chain, and $\lambda$ is the number of long chain branches per 1000 back bone carbon atoms.
2) Measure the absolute molecular weight distribution of a branched sample and a linear sample by SEC DV. Record the resulting molecular weight (M) and intrinsic viscosity (IV) pairs at each SEC elution volume increment.
3) Plot log IV versus log M for the branched polymer sample and the linear polymer sample.
4) Fit the log IV versus log M plot for the linear sample with a first order polynomial over the log molecular weight range of 6 to 5.
5) Make an initial guess at $\lambda$. Using the equation in 1) above, calculate n.
6) Using the n value determined in 5) and the Zimm-Stockmayer equation for fractionated, randomly branched, trifunctional branch points, calculate g (see references 2 and 3 "number average equation").
7) Assuming $g'=g^{(0.5)}$ calculate g', the ratio of branched polymer intrinsic viscosity to linear polymer intrinsic viscosity, and calculate this value at each molecular weight M.
8) Using the calculated g' and the straight line fit in 4) for the linear reference intrinsic viscosity, calculate the branched polymer intrinsic viscosity at molecular weight M
9) Repeat 8) for all molecular weights covering the log M range of 6.5 to 4.8.
10) Determine the appropriate weighted sum of squares*. Use an optimization routine such as solver in EXCEL to vary the value of $\lambda$ until the weighted sum of squares is minimized.

*two independent weightings are used. One weighting factor is the C^6 where C is the concentration of polymer eluting at a given retention volume increment. The second weighting factor is M, the molecular weight of the branched polymer. Thus, the equations for calculating the weighted sum of squares is as follows:

$$SS_C = \Sigma C^{6*}(\eta_{M,expd} - \eta_{M,pred})^2$$

$$SS_M = \Sigma M^*(\eta_{M,expd} - \eta_{M,pred})^2$$

11) Determine the experimental g' at each M covering the log M range of 6.5 to 4.8. Determine g assuming that $g=g'^2$. Determine n from the Zimm Stockmayer equation for randomly branched, trifunctional branch sites in fractionated samples (referred to as the "number average" equation in references 2 and 3). Calculate $\lambda$ using the equation given in 1) above. Calculate the average branch frequency by summing the product of the weight fraction of polymer and the branch frequency at that particular molecular weight. Sum from log M=6.5 until g' reaches a maximum value, or 1. This value is referred to as the Brute Force LCB value.

(1) T. H. Mourey and S. T. Balke, "A Strategy for Interpreting Multidetector Size-Exclusion Chromatography Data I: Development of a Systematic Approach," Am. Chem. Soc. Symp. Ser.,521, 180 (1993).
(2) A. Rudin, "Measurement of Long-Chain Branch Frequency in Synthetic Polymers," in H. G. Barth and J. W. Mays (Eds.), Modern Methods of Polymer Characterization," John Wiley and Sons, New York, 1991.
(3) S. Pang and A. Rudin, "Size-Exclusion Chromatographic Assessment of Long-Chain Branch Frequency in Polyethylenes," Am. Chem. Soc. Symp. Ser. 521, 254 (1993).

Example 1

Two HIPS products are produced as described in Table I, under the same conditions utilizing a conventional 3 reactor set up where temperatures and agitation rates are adjusted to obtain the desired particle size.

TABLE I

| Property | Units | Comparative Example 1 | Example 1 |
|---|---|---|---|
| Rubber type | | polybutadiene | polybutadiene |
| % Cis | % | 98 | 97 |
| Solution viscosity | cPoise | 160 | 280 |
| Mooney Viscosity | ML 4 + 1 100° C. | 45 | 60 |
| No of branches per 10,000 C atoms | | 1.8 | 0.5 |
| Wt. % Rubber | | 6.5 | 6.5 |
| Rubber Particle size, Dv | Microns | 2.0 | 2.0 |
| Rubber Particle mode | Microns | 2.6 | 2.6 |
| Mineral Oil | Wt. % | 0.6 | 0.45 |
| Izod Impact (Notched) | J/m | 111.3 | 106 |
| Tensile Yield Stress | MPa | 23.0 | 26.4 |
| Flexural Strength | MPa | 38.8 | 46.4 |

All physical properties are determined by compression molding.

As can be seen, Example 1 has a improved rigidity as seen by tensile and flexural parameters when compared to Comparative Example 1.

Example 2

A second set of samples are produced, as in Example 1 and are described in Table II.

TABLE II

| Property | Units | Comparative Example 2 | Example 2 |
|---|---|---|---|
| Rubber type | | Polybutadiene | Polybutadiene |
| Cis % | | 45 | 97 |
| Solution viscosity | cPoise | 160 | 280 |
| Mooney Viscosity | ML 4 + 1 100° C. | 45 | 60 |
| No of branches per 10,000 C atoms | | 1.2 | 0.5 |
| Wt. % Rubber | | 8.3 | 8.3 |
| Rubber Particle size, Dv | Microns | 2.4 | 2.5 |
| Rubber Particle mode | Microns | 3.2 | 3.2 |
| Mineral Oil | Wt. % | 2.0 | 1.6 |
| Izod Impact (Notched) | J/M | 105 | 125 |
| Tensile Yield Stress | MPA | 13.7 | 20.5 |

Example 2 has better mechanical properties than comparative Example 2.

What is claimed is:

1. A rubber modified monovinylidene aromatic polymer comprising:
   a) a monovinylidene aromatic polymer matrix; and
   b) rubber particles dispersed therein, characterized in that the rubber particles are produced from a diene rubber having substantially linear structure containing less than one long chain branch per 10,000 carbon atoms in the polymer backbone with a solution viscosity of 5 cPoise to 1,000 cPoise and a Mooney Viscosity of 5 to 120.

2. The rubber modified monovinylidene aromatic polymer of claim 1, wherein the rubber has a solution viscosity of 10 to 900 cPoise and a Mooney viscosity of 10 to 100.

3. The rubber modified monovinylidene aromatic polymer of claim 1, wherein the rubber has a solution viscosity of 20 to 800 cPoise and a Mooney viscosity of 20 to 90.

4. The rubber modified vinyl aromatic polymer of claim 1, wherein the rubber has less than one long chain branches per 11,000 carbon atoms on the polymer chain backbone.

5. The rubber modified monovinylidene aromatic polymer of claim 1, wherein the amount of rubber in said polymer is 2 to 20 weight percent based on the total weight of said polymer.

6. The rubber modified vinyl aromatic polymer of claim 1, wherein the rubber is dispersed as particles having a volume average particle size from 0.1 micron to 10 micron.

7. The rubber modified monovinylidene aromatic polymer of claim 1, wherein the rubber particles are dispersed in the form of small and large particles, wherein the volume average particle diameter of the small particles is from about 0.1 to about 2 micrometers and volume average particle diameter of the large particles is from about 2 to about 6 micrometers.

8. The rubber modified monovinylidene aromatic polymer of claim 1, wherein the monovinylidene aromatic polymer is polystyrene.

9. The rubber modified monovinylidene aromatic polymer of claim 1, wherein the diene rubber is polybutadiene.

10. The rubber modified monovinylidene aromatic polymer of claim 1, wherein the diene rubber is a mixture of one or more rubbers such that the substantially linear component is at least 25% by weight.

11. The rubber modified monovinylidene aromatic polymer of claim 1, wherein the diene rubber has a 1,4 cis content of greater than 30 percent.

12. A process for preparing a rubber-modified monovinylidene aromatic polymer comprising the steps of: (a) continuously supplying a reaction mixture comprising monovinylidene aromatic monomer and a dissolved diene rubber to a reactor means, (b) continuously polymerizing the monovinylidene aromatic monomer in the presence of the dissolved diene rubber in the reactor means under conditions whereby phase inversion subsequently occurs, (c) continuously removing from the reactor means a diene rubber-reinforced monovinylidene aromatic polymer, which process is characterized in that: (d) the diene rubber which is dissolved in the reaction mixture has substantially linear structure such that it contains less than one long chain branches per 10,000 carbon atoms in the polymer backbone, having a solution viscosity value of 5 to 1,000 cPoise and a Mooney viscosity value of 5 to 120, and a 1,4 cis content of greater than 30 and, optionally, (e) the use of appropriate amounts of grafting initiators and sufficient level of agitation of the reactors to achieve desired rubber particle size distribution.

13. The process of claim 12, wherein the monovinylidene aromatic polymer is polystyrene.

14. The process of claim 12, wherein the rubber is polybutadiene.

15. The process of claim 12, wherein the diene rubber is a mixture of one or more rubbers such that the substantially linear component is at least 25% by weight of the total diene rubber present.

16. The process of claim 12, wherein the diene rubber has a 1,4 cis content of greater than 30 percent.

17. The process of claim 12, wherein the process further comprises (e) the use of a blend of two different diene rubbers in the reaction mixture to achieve desired rubber particle size and particle size distribution.

18. An article produced from the rubber modified polymer of claim 1.

* * * * *